Feb. 13, 1923.

C. H. DOOLEY 1,444,782

FRICTION CLUTCH

Filed May 8, 1919

Inventor.
Clarence H. Dooley.
H. H. Bliss
Atty.

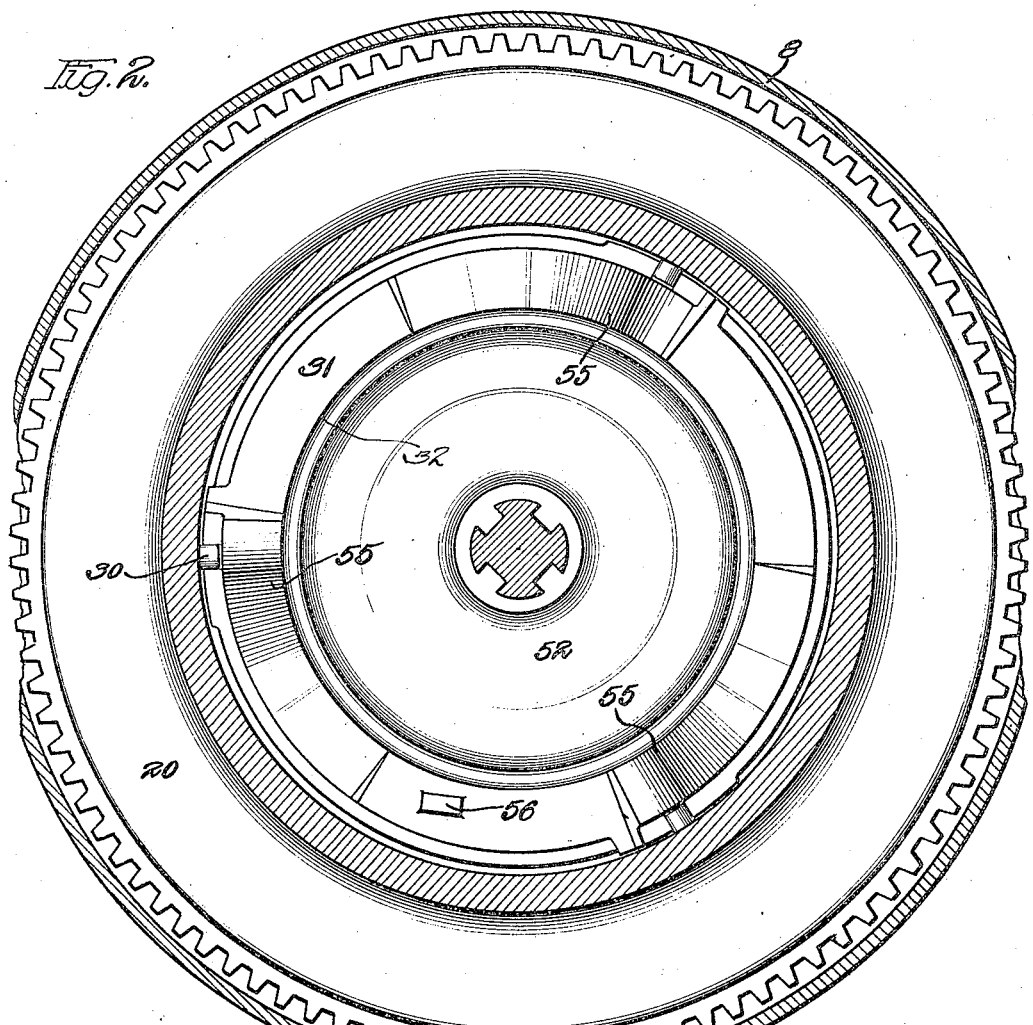
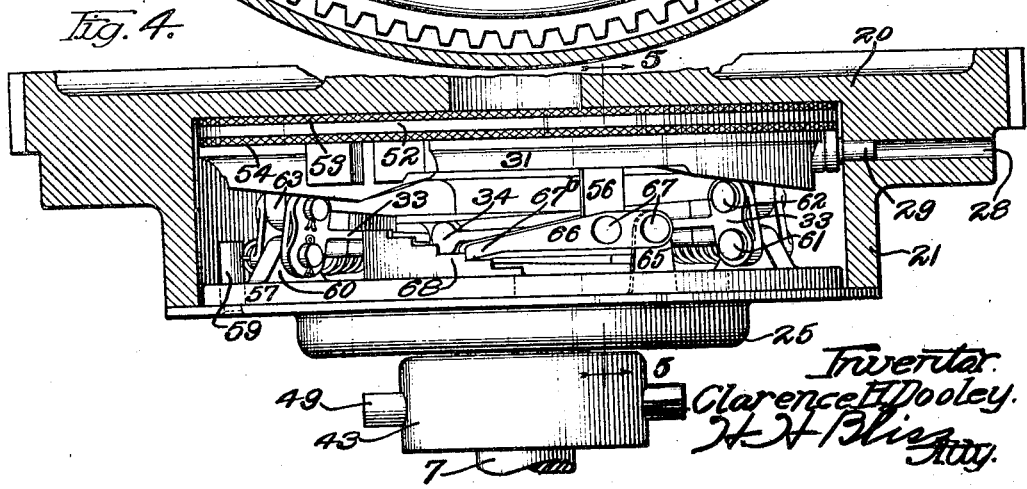

Feb. 13, 1923.

C. H. DOOLEY

FRICTION CLUTCH

Filed May 8, 1919

Inventor:
Clarence H. Dooley.
H H Bliss
Atty.

Patented Feb. 13, 1923.

1,444,782

UNITED STATES PATENT OFFICE.

CLARENCE H. DOOLEY, OF ROCK ISLAND, ILLINOIS.

FRICTION CLUTCH.

Application filed May 8, 1919. Serial No. 295,576.

*To all whom it may concern:*

Be it known that I, CLARENCE H. DOOLEY, a citizen of the United States, residing at Rock Island, in the county of Rock Island and State of Illinois, have invented certain new and useful Improvements in Friction Clutches, of which the following is a specification, reference being had therein to the accompanying drawing.

My invention relates to structures that are commonly known as double faced plate clutches. These devices are arranged for transmitting motion between two rotary parts by means of the frictional engagement on the opposite faces of a plate secured to rotate with one of the parts.

In clutches of this type it is commonly known that frequent adjustment is required to insure engagement between the plate and the friction means carried by the opposite radial members. These friction surfaces are subject to considerable wear and frequent adjustment is required to compensate therefor.

It is a general practice in devices of this character to compensate for the wear at a plurality of points on the periphery of the device. For example, the friction members carried by one rotating member are brought into engagement with the friction plate by means of a plurality of bell crank levers actuated from a common moving element. As the friction members wear down, these bell crank levers are required to pass over a greater extent of travel before establishing frictional engagement. It is the common practice to advance the fulcrums of all of the bell crank levers together in order to compensate for this wear and thus to render uniform the stroke necessary to bring the friction members into engagement with the plate.

In this form of device there are manifest disadvantages in this form of adjustment. It requires that the device be made stationary and be put out of operation for a considerable length of time while this adjustment is accomplished manually.

My invention accomplishes an adjustment of the plate clutch and its parts to compensate for wear in a manner which is entirely uniform around the periphery of the clutch, is simultaneous for all of the bell crank levers involved and independent of the handling of the operator.

The compensation for wear obtained by the operation of my adjusting means is caused regardless of the operation of the device by the operator and even without his knowledge. There is, therefore, no danger of his interference with the successful adjustment, or of his making an improper adjustment. Furthermore, the extent to which the adjustment is made is determined before hand and is a matter of calculation separate from the caprice of the operator. This adjustment is also made without calling upon the services of skilled mechanics.

A further object of my invention is to provide means whereby the adjustment of the wearing surfaces of the clutch may be made without placing the machine out of service.

Specifically, my invention comprises a means for mechanically accomplishing an adjustment of the bell crank levers by a step by step movement dependent upon the extent of forward motion normally required to bring the clutch parts into operative engagement. The means by which this result is accomplished will be evident from the following specification and drawings in which, Figure 1 is a vertical longitudinal section of the device;

Figure 2 is a vertical transverse section taken on the line 2—2, of Figure 1;

Figure 4 is a horizontal longitudinal section taken on the line 4—4 of Figure 3.

Figure 1:
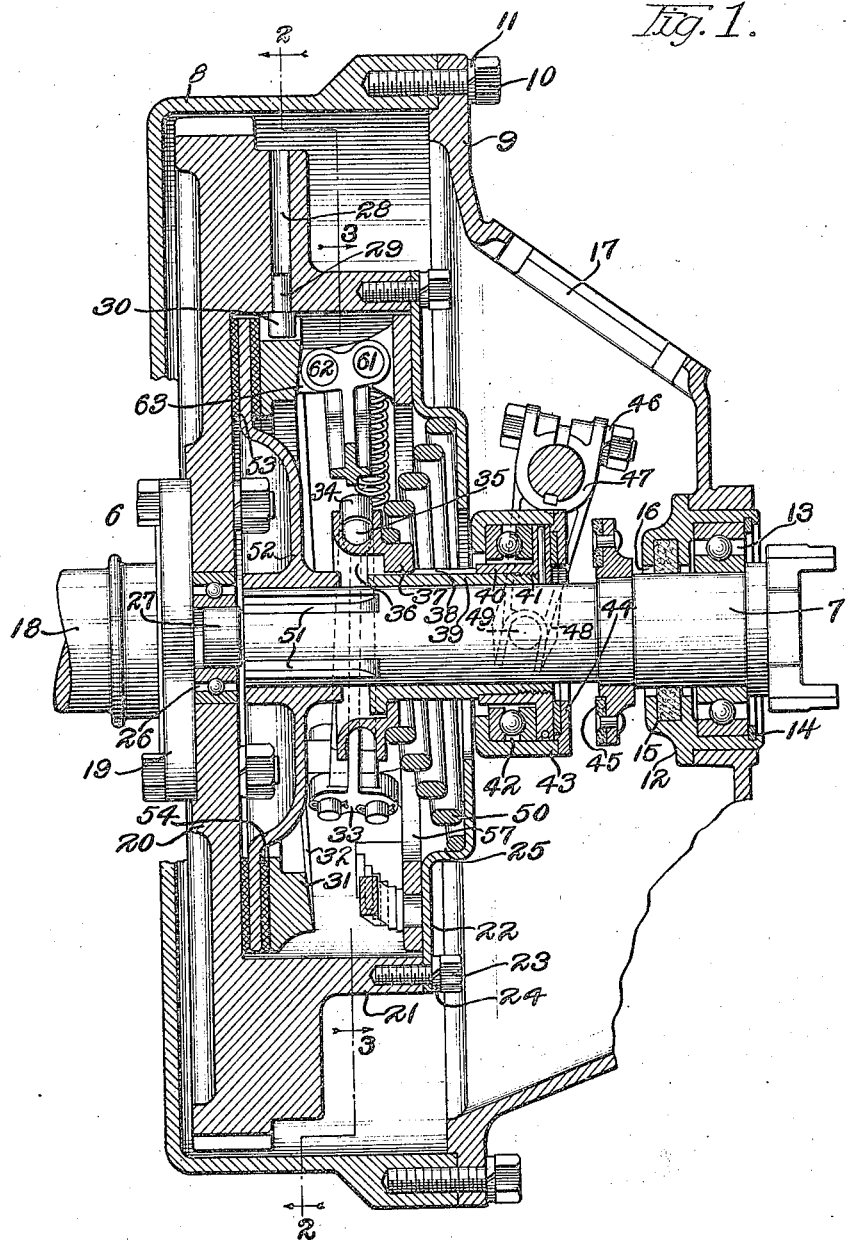
Figure 5:
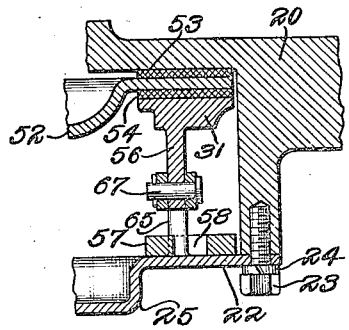
Figure 5 is a vertical longitudinal section taken on the line 5—5 of Figure 4.
Figure 3:
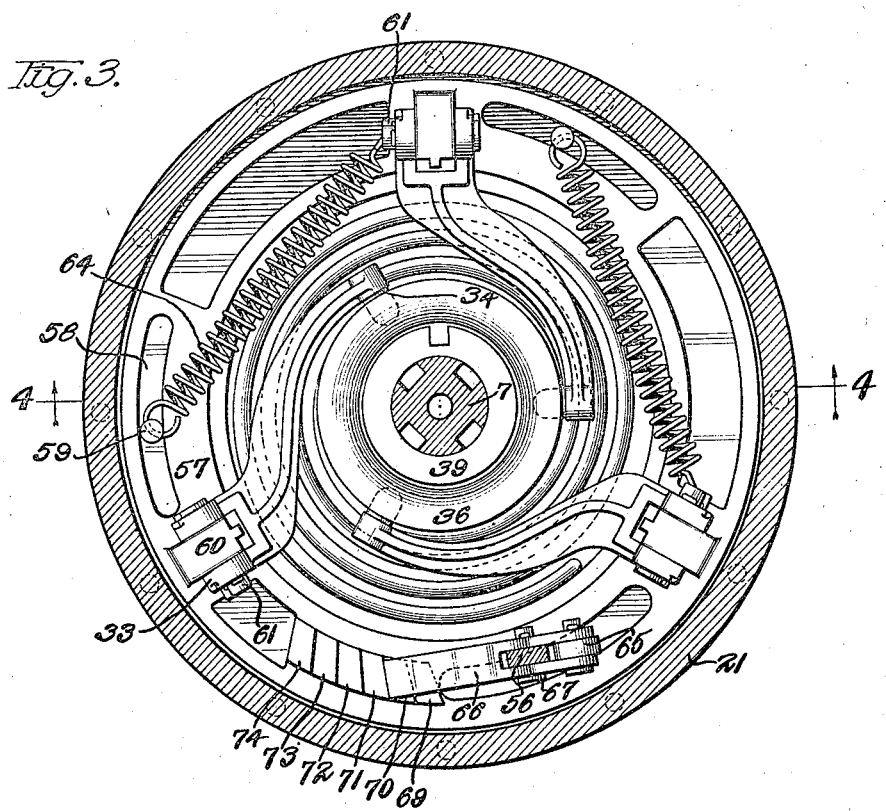
Figure 3 is a vertical transverse section taken on the line 3—3 of Figure 1.

The clutch is shown as an entirety in the drawings by the numeral 6 which constitutes a driving member, and the driven member 7. This clutch mechanism is contained in a casing 8 mounted on some convenient frame structure, not shown. A portion of the casing 9 is bolted to the member 8 by means of bolts 10 and lock nuts 11. This casing 9 includes a journal bearing 12 in which is the antifriction member 13. This latter constitutes one bearing for the driven member 7. The member 12 retains the antifriction member 13 by means of a locking ring 14. A washer 15 closely surrounds the shaft 7 where it passes through the recess 16 of the journal bearing. The upper portion of the casing 9 has an aperture 17 for the reception of the operating lever.

The driving means 6 includes the shaft 18 terminating in a flange 19. Bolted to the flange 19 is the fly wheel 20. The fly wheel 20 has upon one side the axially extending wall 21. A plate 22 is bolted to the wall 21 by means of the bolts 23 and the lock nuts 24. This plate 22 is recessed as at 25 for the seating of a spring to be later described. Centrally disposed of the flange 19 and opposite the shaft 18 the fly wheel is constructed with a recess in which is placed an antifriction member, specifically a roller bearing 26.

The inner member of the roller bearing carries the cylinder 27 mounted on the shaft 7 and constituting a bearing for it. A plurality of recesses 28 is drilled radially of the fly wheel. In each of the recesses 28 is placed a pin 29 with an enlarged head 30. These pins serve to retain an annulus 31 in rotary engagement with the fly wheel. The annulus 31 carries on its face an outwardly inclined path generally noted by the numeral 32.

Bell crank levers 33 are provided with the bearing heads 34. These latter seat in the circular groove 35 of a collar 36. The collar 36 has a key 37 for engagement in the keyway 38 of the sleeve 39 revoluble on the shaft 7. On the opposite end of the sleeve 39 is mounted a ring 40 by means of the screw threads 41. This ring 40 has a flaring web engaged on the one side by a thrust bearing 42 held in a ring 43. The opposite side of the web is engaged by the rings 43 and 44. The rings 43 and 44 are fastened for rotation together around the web of the ring 40. The member 44 has a plane outer face for engagement with the brake member 45 mounted to rotate with the shaft 7. Above the collar 43, and journaled in the casing 9, is mounted a rock shaft 46 to which is keyed a yoke 47. The lower branches of the yoke 47 are bifurcated as at 48 for engagement with the opposite lugs 49 on the ring 43.

The spring 50, seated in the recess 25 of the plate 22, serves to abut against a part of the ring 36 and thus hold the latter extended against a shoulder on the forward part of the sleeve 39.

The front end of the shaft 7 has a plurality of slots 51. Mounted to slide within these slots is the hub of a plate 52, the outer portion of which rides between the friction ring 53 mounted on the adjacent face of the fly wheel 20 and the friction ring 54 mounted on the side of the annulus 31.

Intermediate two adjacent inclined paths on the annulus 31 is a lug 56 for a purpose that will appear later. Slidable on the inner wall of the plate 22 is a ring member 57 carrying a plurality of concentric slots 58. Certain of these slots allow the passageway therethrough of the pins 59 which are rigidly secured in the plate 22. Lugs 60 extend vertically from the face of the plate 57 and are drilled for the reception of pivot pins 61. These pins form fulcrums for the bell crank levers 33. Adjacent the fulcrums of the bell crank levers are recesses carrying pivot pins 62 parallel with pins 61 and serving as journals for the wedges 63. These wedges 63 ride radially upon the inclined paths 55 of the part 31. The ring 57 and the parts mounted thereon constitute a clamping member.

The pins 59 and 61 are drilled transversely at their adjacent ends for the springs 64 which serve to draw the plate 57 toward the pins 59. Mounted on the inner wall of the plate 22 and in juxtaposition with the lug 56 is the drilled lug 65. A multiplying lever 66 is mounted upon the lugs 56 and 65 by means of the bearing pins 67. The forward end of this lever 66 carries the tooth $67^b$. Mounted upon the inner wall of the plate 57, and immediately adjacent the tooth $67^b$, is a flight 68 of stepped cam faces of progressively increasing heights. As shown in the illustration, this stepped cam face has six faces 69, 70, 71, 72, 73 and 74 of uniformly increasing height and are adapted to be engaged in succession by the tooth $67^b$.

When initially set, the tooth $67^b$ will engage the front wall of the lowest step 69 and will hold the plate 57 extended against the full force of the spring 64. In this position the wedges 63 come in contact with the annulus 31 opposite the foot of the inclined paths 55. This relationship of parts continues during the normal operation. The spring 50 serves to hold the collar 36 advanced and consequently the wedges 63 are in sufficiently tight engagement to clamp the friction members 53 and 54 closely on the opposite faces of the plate 52. Any rotation of shaft 18 is consequently transmitted through the plate 52 to the driven shaft 7.

The clutch is released by operation of the rocking lever 46 which draws the collar 36 rearwardly and by means of the bell crank levers 33 releases the wedges 63 from engagement with the annulus 31. This release of pressure serves to free the plate 52 from the friction members, permitting the driving member to rotate freely without rotating the plate 52 or driven member. A certain amount of wear is caused during the engagement and disengagement of the plate and the friction rings.

After long operation in the above relationship of parts, it will be found that the friction rings have been worn down to such an extent that the rocking arm 46 must travel an abnormal distance before the plate 52 is locked into position for rotation with the fly wheel.

When this condition has been reached, it is necessary to provide for an adjustment to take up this wear and to restore the throw of the yoke lever 46 to its normal extent. This is accomplished by means of the travel of the multiplying lever 66 against the face of the cam 69. The lever 66 is so proportioned that the forward movement of the annulus 31 gives a multiplied forward movement of the tooth 67$^b$. A point is reached where this tooth 67$^b$ travels a greater distance than the rise between successive steps of the cam faces 69 and 70. It follows that the displacement of the tooth 67$^b$ frees the plate 57 and permits it to rotate under the influence of the spring 64 until the tooth 67$^b$ abuts against the next succeeding vertical wall on the cam face.

This partial rotation of the plate 57 and its associated parts, including the bell crank levers 33, serve to displace the operative relationship of the wedges 63 from their former positions on the inclined paths 55 and to bring them further up that inclined path. The next succeeding movements of disengaging and engaging the clutch will comprise movements of normal extent originally found with the full friction members.

At each successive adjustment of the plate 57 the wedges 63 will be, respectively, advanced to radial lines on the inclined surfaces 55 where the thickness, measured axially of the annulus, is somewhat greater than was the thickness at the lines, respectively, of the previous positions of the wedges. And consequently the annulus, as an entirety, will, after each successive adjustment, be caused to reciprocate, axially, over a path somewhat farther along the axis than was the path over which it reciprocated under the last preceding adjustment. This continuous, step by step, until the wedges have been advanced around the axis until they, respectively, come near the terminations of the inclined surfaces 55. At such time the parts susceptible of wear have been practically worn out and others must be substituted.

This cycle of operation and adjustment will be repeated as often as the friction members wear down a distance sufficient to permit the tooth 67$^b$ to travel up one step in the cam 68.

It will be evident that provision has therefore been made to adjust the relation of parts between the annulus 31, with its curved path on the one hand, and the plate 57, with its locking wedges 63 on the other hand, so that a definite extent of travel is always given to the bell crank levers 33 regardless of the wear which has been caused in the friction members 53 and 54.

What I claim is:

1. In a friction clutch, a driving member including a casing and a frictional annulus, said annulus having a plurality of cam faces, a ring supported in the casing and having a plurality of expanding members, means to cause the expansion of the members against the cam faces of the annulus, means to advance the members on the cam faces by a step by step movement and intermittently-acting power devices to actuate the last said means when the annulus moves axially to predetermined points.

2. In a friction clutch, a driving member including a casing, a frictional annulus carried therein, wedging means mounted in said casing for moving the annulus longitudinally of the axis of the member, intermittently acting means to move said wedging means circumferentially and power devices for actuating the last said means brought into action when said annulus moves axially a predetermined distance.

3. In a friction clutch, a driving member including a casing, an annulus carried therein, wedging means mounted in said casing for moving the annulus longitudinally of the axis of the member, intermittently acting means to move said wedging means circumferentially and a stop operated by the annulus to control the movement of the wedging means.

4. In a frictional plate clutch, a driven member having a plate, a driving member including a casing and a frictional annulus, said annulus having a plurality of inclined faces, a ring supported within said casing and carrying wedging means opposite said annulus, means for rotating the ring in said casing, and means preventing said rotation during the normal operation of said wedging means.

5. In a plate clutch, a driven member having a plate, a driving member including a casing and a frictional annulus, said annulus having a plurality of inclined faces, a ring supported within said casing and carrying wedging members opposite said annulus, means for rotating the ring with respect to said inclined faces, and means preventing such rotation during the normal operation of said wedging members.

6. In a plate clutch, a driven member having a plate, a driving member including a casing and a frictional annulus, said annulus having a plurality of inclined faces, a ring supported within said casing and carrying wedging members opposite said annulus, a plurality of pins projecting within the casing, springs extending from the wedging members to the pins and means to prevent the contraction of said springs during the normal operation of said wedging members.

7. In a plate clutch, a driven member having a plate, a driving member including a casing and a frictional annulus, said annulus having a plurality of inclined faces, a ring supported within said casing and carrying wedging members opposite said annulus, means for rotating the ring in said casing, means normally locking said ring against rotation, and means for releasing the locking means when the annulus has advanced a predetermined distance axially.

8. In a plate clutch, a driven member having a plate, a driving member including a casing and a frictional annulus, said annulus having a plurality of inclined faces, a lug on said annulus, a ring having concentric slots supported within said casing and carrying wedging members opposite said annulus, a plurality of pins and a lug projecting within said casing, springs between the wedging members and the pins, an inclined toothed rack on said ring and a lever pivoted on said lugs and engaging said rack.

9. In a plate clutch, a driven member having a plate, a driving member including a casing and a frictional annulus, said annulus having a plurality of inclined faces, a lug on said annulus, a ring having concentric slots supported within said casing and carrying wedging members opposite said annulus, a plurality of pins and a lug projecting within said casing, springs between the wedging members and the pins, an inclined toothed rack on said ring and a multiplying lever pivoted on said lugs and engaging said rack.

10. In a plate clutch, a driven member having a plate, a driving member including a casing and a frictional annulus, said annulus having a plurality of inclined faces, a lug on said annulus, a ring having concentric slots supported within said casing and carrying wedging members opposite said annulus, a plurality of pins and a lug mounted in said casing and projecting through said ring slots, springs between the wedging members and pins, an inclined toothed rack on said ring, a lever pivoted on said lugs and engaging said rack, and means to expand the wedging members.

11. In a plate clutch, a driven member having a plate, a driving member including a casing and a frictional annulus, opposite lugs on the casing and the annulus, a lever pivoted on said lugs, a ring and wedging members between said annulus and casing, an inclined toothed rack on said ring in engagement with said lever, and means to release said lever from engagement therewith.

12. In a plate clutch, a driven member including a plate, a driving member comprising a casing and a frictional annulus, a lever mounted on said casing and said annulus, a clamping member disposed between said casing and said annulus, said clamping member being subject to rotational tension, and means on said clamping member in selective engagement with said lever.

13. In a plate clutch, a driven member including a plate, a driving member including a casing and a frictional annulus, a clamping member between said casing and said annulus, tension means operative to rotate said clamping member with respect to said annulus, locking means for said clamping member releasable on the failure of the clamping member to function.

14. In a plate clutch including a driven member having a plate, a driving member including a casing and a frictional annulus, a clamping member between said casing and annulus, a spring motor, means to release said spring motor on the forward stroke of the clamping member and means operatively connecting the motor to the clamping member to bodily move it relatively to the annulus.

15. In a plate clutch including a driven member having a plate, a driving member including a casing and a frictional annulus, a clamping member between said casing and annulus, a spring motor, means to release the said spring motor by successive predetermined amounts, and means for operatively connecting the motor to said clamping member to positively adjust it relatively to the annulus.

16. In a friction clutch, a driving member including a casing and a frictional annulus, said annulus having a plurality of cam faces, a ring supported in the casing and having a plurality of thrust members, means to cause the thrust of the members against the cam faces of the annulus, means to advance the members on the cam faces by a step by step movement and intermittently-acting power devices to actuate the last said means when the annulus moves axially to predetermined points.

17. In a friction clutch, a driving member including a casing, a frictional annulus carried therein, thrust means mounted in said casing for moving the annulus longitudinally of the axis of the member, intermittently acting means to move said thrust means circumferentially and power devices for actuating the last said means brought into action when said annulus moves axially a predetermined distance.

18. In a frictional plate clutch, a driven member having a plate, a driving member including a casing and a frictional annulus, said annulus having a plurality of inclined faces, a ring supported within said casing and carrying thrust means opposite said annulus, means for rotating the ring in said casing, and means preventing said rotation during the normal operation of said thrust means.

19. In a plate clutch, a driven member having a plate, a driving member including a casing and a frictional annulus, said annulus having a plurality of inclined faces, a ring supported within said casing and carrying thrust members opposite said annulus, means for rotating the ring with respect to said inclined faces, and means preventing such rotation during the normal operation of said thrust members.

In testimony whereof, I affix my signature, in presence of two witnesses.

CLARENCE H. DOOLEY.

Witnesses:
AXEL CARLSON,
ETHEL JOHNSON.